(12) United States Patent
Durot et al.

(10) Patent No.: US 11,828,688 B2
(45) Date of Patent: Nov. 28, 2023

(54) AEROSOL MATTER COLLECTION DEVICE

(71) Applicant: Mativ Holdings, Inc.

(72) Inventors: Nathalie Durot, Le Mans (FR); Stephane Rouillard, Le Mans (FR); Franck Binard, Le Mans (FR)

(73) Assignee: Mativ Holdings, Inc., Alpharetta, GA (US)

( * ) Notice: Subject to any disclaimer, the term of this patent is extended or adjusted under 35 U.S.C. 154(b) by 120 days.

(21) Appl. No.: 17/320,670

(22) Filed: May 14, 2021

(65) Prior Publication Data

US 2021/0356364 A1 Nov. 18, 2021

Related U.S. Application Data

(60) Provisional application No. 63/025,620, filed on May 15, 2020.

(51) Int. Cl.
G01N 1/22 (2006.01)

(52) U.S. Cl.
CPC ... G01N 1/2205 (2013.01); G01N 2001/2223 (2013.01)

(58) Field of Classification Search
CPC .......... G01N 1/2205; G01N 2001/2223; A24F 40/80
See application file for complete search history.

(56) References Cited

U.S. PATENT DOCUMENTS

| 10,477,887 | B2 * | 11/2019 | Verbeeck | ................ | A24C 5/34 |
| 2009/0120449 | A1 | 5/2009 | Tindall | | |
| 2017/0158360 | A1 * | 6/2017 | Rubio Aguilera | ........ | A61J 1/20 |
| 2020/0158706 | A1 | 5/2020 | Pringle et al. | | |

FOREIGN PATENT DOCUMENTS

| EP | 2 959 783 A1 | 12/2015 |
| EP | 3 399 298 A1 | 11/2018 |
| WO | WO 2013/060829 A2 | 5/2013 |
| WO | WO 2014/206934 A1 | 12/2014 |

OTHER PUBLICATIONS

International Search Report and The Written Opinion of the International Searching Authority, or the Declaration Corresponding to Application No. PCT/IB2021/054165 dated Jul. 23, 2021.

* cited by examiner

Primary Examiner — David Z Huang
(74) Attorney, Agent, or Firm — Dority & Manning, P.A.

(57) ABSTRACT

A system and process for collecting aerosol matter samples is disclosed. The system includes a circular sample cartridge holder that contains a plurality of sample cartridges. Each sample cartridge contains a filter media for collecting aerosol matter samples. The system further includes a docking device for receiving an aerosol-generating system. The docking device places the aerosol-generating system in engagement with one of the sample cartridges. The aerosol matter collecting system further includes an aerosol withdrawing device that causes a controlled puff volume to flow through a sample cartridge for collecting an aerosol matter sample. The system can be completely automated and can collect samples on a puff by puff basis. The system and process are well suited to analyzing aerosols collected heated tobacco product system, but can also be used to test smoking articles, such as cigarettes, or any other device or product such as e cigarette that produces an aerosol.

20 Claims, 6 Drawing Sheets

AEROSOL MATTER COLLECTION DEVICE

RELATED APPLICATIONS

The present application is based upon and claims priority to U.S. Provisional Patent Application Ser. No. 63/025,620, having a filing date of May 15, 2020, which is incorporated herein by reference.

BACKGROUND

Recently, consumers have been moving away from conventional smoking articles, such as cigarettes, that work through the combustion of a filler, such as a tobacco filler. Instead, various different aerosol-generating devices have been developed that generate an aerosol without burning or combusting a substrate. Such aerosol-generating articles include, for instance, heat not burn system, e-cigarettes, and the like. In these systems, an aerosol-forming substrate is heated rather than combusted to produce an aerosol, which is a suspension of fine solid particles and/or liquid droplets in a gas (usually air), that can be inhaled by a user. The aerosol-forming substrate can be a solid and/or a liquid. For example, in one embodiment, the aerosol-forming substrate can be a tobacco or a botanical containing material. In an alternative embodiment, the aerosol-generating substrate can be a solution containing nicotine and/or tobacco aroma and botanical extracts. In an alternative embodiment, the aerosol-generating substrate can be the combination of a tobacco or botanical substrate with a solution containing tobacco or botanical extracts.

Aerosol-generating systems as described above can produce an aerosol for inhalation by the user while avoiding many drawbacks of conventional cigarettes. For instance, the aerosol of aerosol-generating devices may contain lower levels of various constituents that are produced when a material is combusted, such as tar. In addition, by not combusting a material, aerosol-generating devices operate without creating any significant fire hazards.

In view of the above, those skilled in the art have been attempting to refine aerosol-generating systems and the substrates that are used in the devices in order to produce an aerosol with controlled amounts of different components. For example, one reoccurring problem in developing aerosol-generating substrates for use in aerosol-generating devices is the ability to accurately control nicotine, tobacco or botanical aroma levels in each puff of aerosol. Not only are nicotine, tobacco or botanical aroma levels difficult to control, but the amount of nicotine or other components contained in each puff of aerosol can vary widely from puff to puff. For example, in many of the above heated tobacco products, the deliveries in the first puff of aerosol can be vastly different than in deliveries in the last puff of aerosol. It is common, for instance, for the quality of each puff of aerosol and/or the amount of components in each puff of aerosol to diminish over time as the aerosol-generating substrate is heated.

In view of the above, testing equipment is needed in order to test different aerosol-generating substances or prototypes under different conditions in order to further improve the overall product. Unfortunately, however, those skilled in the art have failed to develop an adequate device for testing and collecting aerosol matter samples from aerosol-generating devices. Various testing equipment does exist for obtaining smoke samples from cigarettes. These testing devices, however, are not suitable for use with aerosol-generating devices. For instance, as opposed to solid particles, such as carbon-based solid particles generated by burning cigarettes, the primary constituent of aerosols generated from aerosol-generating devices are suspensions of fine solid particles and/or liquid droplets in a gas.

Consequently, different testing equipment is needed in order to collect and analyze aerosol matter samples.

In view of the above, a need exists for an aerosol matter collection device that can collect aerosol matter samples from aerosol-generating systems. A need also exists for an aerosol matter collection device that is capable of collecting aerosol matter samples on a puff by puff basis so that one can compare the analysis of puffs originating from the same aerosol-generating substrate. In addition, a need exists for a system that can collect puff per puff samples and limit the number of substrates, such as sticks, that are required to make an accurate analysis contrary to conventional systems where the collection of data is realized by multiplying analysis with cumulative puff or single puff analysis with specific expensive and time consuming tests, such as gas chromatography.

SUMMARY

In general, the present disclosure is directed to an aerosol matter collection device. The aerosol matter collection device is particularly well suited to collecting aerosol samples originating from heat not burn or heated tobacco product and/or e-cigarettes. The aerosol matter collection device is capable of automatically collecting each individual aerosol puff originating from a single aerosol-generating substrate contained in an aerosol-generating device. The aerosol matter samples are collected on individual filter pads that are contained in sample cartridges.

For example, in one embodiment, the present disclosure is directed to an aerosol matter collection device. The device includes a sample cartridge holder configured to hold a plurality of sample cartridges. In one aspect, the sample cartridge holder comprises a rotatable wheel having a circumference. Sample cartridges can be positioned along the circumference of the wheel. The sample cartridge holder, for example, can hold from about six sample cartridges to about twenty sample cartridges, such as from about ten sample cartridges to about fifteen sample cartridges. The sample cartridge holder can include a first cover positioned opposite a second cover. The sample cartridges can be positioned in between the first cover and the second cover. The design of the sample cartridge holder can limit loss or water gain on filter pads contained within the holder before, during or after testing.

Each sample cartridge contained in the sample cartridge holder can include a housing defining an interior volume. A filter material, such as a filter pad, can be positioned in the interior volume. The sample cartridge can include an entrance on one side of the filter material and an exit on an opposite side of the filter material.

The aerosol matter collection device can further include a docking device for receiving an aerosol-generating device that generates an aerosol from an aerosol-generating substrate. The docking device and the sample cartridge holder can be movable relative to each other such that an aerosol-generating device positioned on the docking device consecutively engages the entrance of each sample cartridge held by the sample cartridge holder. For example, in one embodiment, the docking device can be movable towards and away from the sample cartridge holder for engaging consecutive sample cartridges. The sample cartridge holder, on the other hand, can move in a rotational direction for positioning consecutive sample cartridges in front of the docking device.

The aerosol matter collection device further includes an aerosol withdrawing device positioned opposite the docketing device for engaging the exit of each consecutive sample cartridge held within the sample cartridge holder. The aerosol withdrawing device is configured to withdraw a controlled volume of aerosol generated by an aerosol-generating device loaded onto the docking device. The controlled volume of aerosol is forced through the filter cartridge for collecting an aerosol sample on the filter material.

The aerosol matter collection device of the present disclosure can further include a controller, which may comprise one or more microprocessors. The controller can be in communication with the docking device and the sample cartridge holder and can be configured to move the docking device and the sample cartridge holder in a synchronized manner. The controller can also be in communication with the aerosol withdrawing device for controlling the aerosol withdrawing device for periodically withdrawing a puff of aerosol from an aerosol-generating device positioned on the docking device.

In one embodiment, for example, the controller can be configured to automatically move the docking device into engagement with a filter cartridge contained within the sample cartridge holder. The controller can control the aerosol withdrawing device for withdrawing a puff of aerosol from an aerosol-generating device positioned on the docking device. The puff flows through the sample cartridge for collecting an aerosol matter sample on the filter material. The controller can then disengage the docking device from the sample cartridge held on the sample cartridge holder and can move the sample cartridge holder such that the next consecutive sample cartridge is in alignment with the sample cartridge holder. The above process can then be repeated for collecting aerosol samples on a puff by puff basis in individual sample cartridges.

The present disclosure is also directed to a process for collecting aerosol matter samples from an aerosol-generating device or system. The aerosol-generating device or system can generate an aerosol from a material or substrate without combusting the material. The process includes loading material into an aerosol-generating device for heating the material without combusting the material. The aerosol-generating device is moved into contact with a filter cartridge loaded on a sample cartridge holder. A controlled puff volume is withdrawn from the exit of the sample cartridge causing the collection of aerosol matter from the aerosol-generating device on the filter pad of the sample cartridge. The sample cartridge holder is then moved so that the next consecutive sample cartridge is in alignment with the aerosol-generating device. In this manner, the process is capable of collecting aerosol matter samples in a puff by puff manner.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
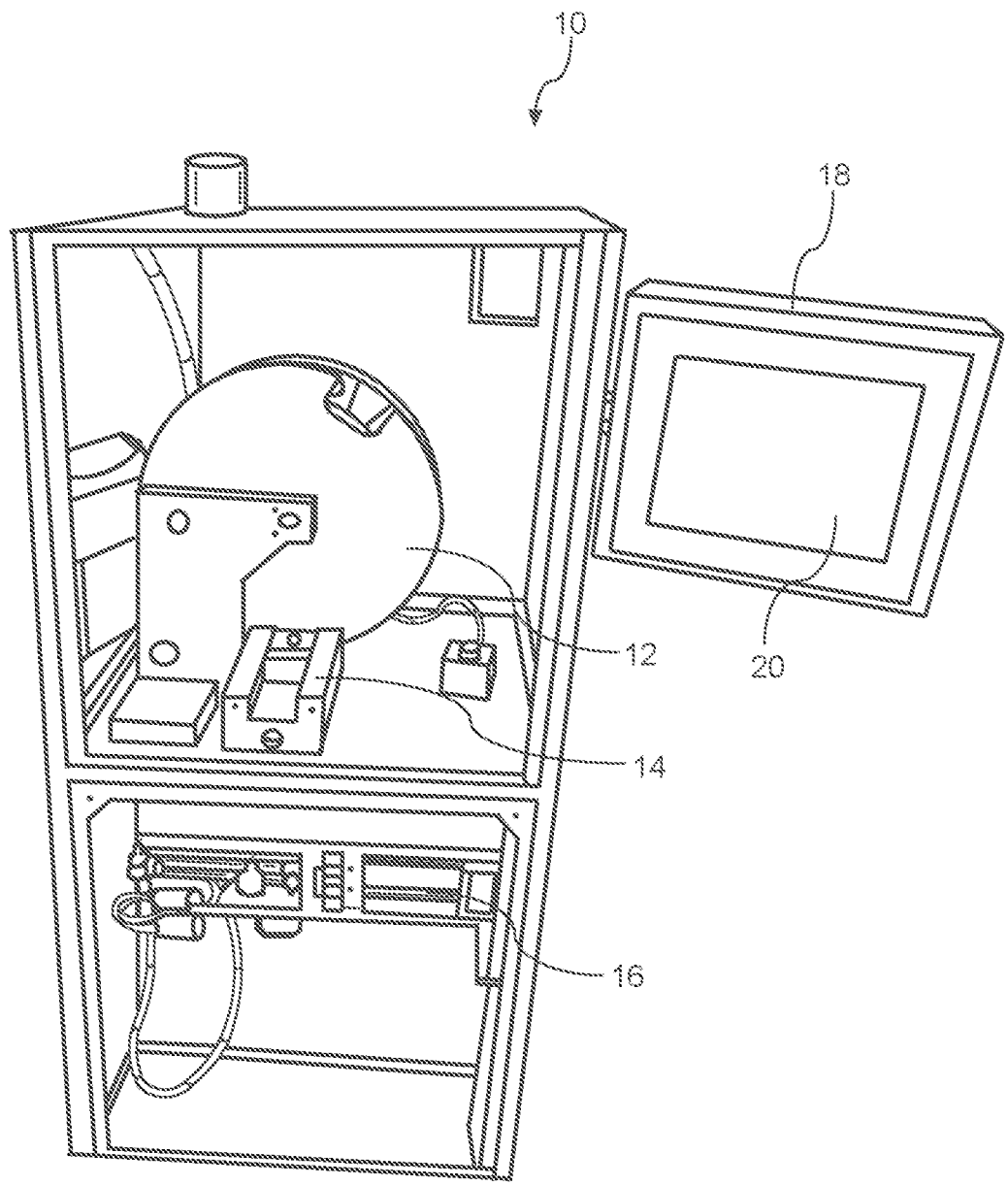
FIG. 1 is a perspective view of one embodiment of an aerosol matter collection device in accordance with the present disclosure.

Repeat use of reference characters in the present specification and drawings is intended to represent the same or analogous features or elements of the present invention.

Definitions

As used herein, an aerosol-generating substrate is directed to a substrate capable of releasing volatile compounds that can form an aerosol. The aerosol-generating substrate can be a liquid, a solid or a combination of both. The aerosol can be released from the aerosol-generating substrate through heat or any other suitable means. The aerosol-generating substrate can be adsorbed, coated, impregnated or loaded onto a carrier or support. The aerosol-generating substrate may also comprise a stand-alone solid, a stand-alone liquid, a gel, or a combination or subcombination of any of the above.

The aerosol-generating substrate can contain various different components and drugs. For example, the aerosol-generating substrate can contain nicotine and can comprise tobacco or can be made from tobacco. The aerosol-generating substrate can also be made from various other plants including cannabis and may contain CBD and/or THC.

As used herein, an aerosol-generating device relates to a device that interacts with an aerosol-generating substrate to generate an aerosol. The aerosol-generating substrate forms part of an aerosol-generating article, for example part of a smoking article. An aerosol-generating device may comprise one or more components used to supply energy from a power supply to an aerosol-generating substrate to generate an aerosol.

An aerosol-generating device may be described as a heated aerosol-generating device, which is an aerosol-generating device comprising a heater. The heater is preferably used to heat an aerosol-generating substrate of an aerosol-generating article to generate an aerosol.

An aerosol-generating device may be an electrically heated aerosol-generating device, which is an aerosol-generating device comprising a heater that is operated by electrical power to heat an aerosol-generating substrate of an aerosol-generating article to generate an aerosol. An aerosol-generating device may be a fuel-heated aerosol-generating device. An aerosol-generating device may be a smoking device that interacts with an aerosol-generating substrate of an aerosol-generating article to generate an aerosol that is directly inhalable into a user's lungs thorough the user's mouth. Examples of aerosol-generating devices include eHTP devices, cHTP devices, aHTP devices, and the like as described in further detail below.

Electrically Heated Tobacco Product (eHTP): A product containing a tobacco substrate that is heated with an electrical Tobacco Heating Device (THD) without combustion of the tobacco in order to produce a nicotine containing aerosol. The eHTP category includes products that contain a tobacco substrate and are designed to be used with an electrical Tobacco Heating Device (THD) that applies indirect resistive or inductive heating of the tobacco; prevents combustion of the tobacco substrate; is battery powered; has a puff count and/or use duration that is limited by either the fixed size of the consumable (the HTP) or device hardware/ software; and are referred to as a Tobacco Heating System (THS) when used in conjunction with a THD. The eHTP category may include products that have a consumable with tobacco wrapped in paper or other material to contain the tobacco substrate during use.

Carbon Heated Tobacco Product (cHTP): A product containing a tobacco substrate that is heated by smouldering carbon in order to produce a nicotine containing aerosol. The cHTP category includes products that have a tobacco substrate in the consumable; indirect heating of the tobacco by smouldering carbon; and a puff count and/or duration that is limited to a single use occasion per consumable. The cHTP category may include products that have a disposable tobacco heating system; a carbon-based heat source where smouldering is initiated by fire; and presence of combustion-related constituents in the aerosol (e.g., Carbon monoxide). The cHTP category does not include products that are waterpipe tobacco products where tobacco is heated by smouldering carbon. Examples of current worldwide commercial products that are cHTPs include products named Eclipse, Revo, Teeps, iQOS, Glo, Lil, MOK, Ploom S, and Pulze.

Aerosol Heated Tobacco Product (aHTP): A product containing a tobacco substrate that is heated by an aerosol produced from an electrical Tobacco Heating Device (THD) without combustion of the tobacco in order to produce a nicotine containing aerosol. The aHTP category includes products that contain a tobacco substrate. They are designed to be used with an electrical Tobacco Heating Device (THD) that produces an aerosol from an e-liquid based consumable that heats the tobacco substrate; prevents combustion of the tobacco substrate; is battery powered; has a puff count and/or use duration that is limited by either the fixed size of the consumable (the HTP) or device hardware/software; and are referred to as a Tobacco Heating System (THS) when used in conjunction with a THD. The aHTP category may include products that have a consumable with tobacco wrapped in paper or other material to contain the tobacco substrate during use of Indirect resistive (or inductive) heating of the tobacco; and a tobacco consumable that is changed more frequently than the e-liquid. The aHTP category does not include products that have combustion of any material including tobacco. The aHTPs are often referred to as "hybrids" and examples of current worldwide commercial products that are aHTPs include products named Ploom TECH, Ploom TECH+, iFuse, Glo Sens, and lil Hybrid.

DETAILED DESCRIPTION

It is to be understood by one of ordinary skill in the art that the present discussion is a description of exemplary embodiments only and is not intended as limiting the broader aspects of the present disclosure.

The present disclosure is generally directed to an aerosol matter collection device. The aerosol matter collection device is well suited for collecting aerosol matter samples from aerosol-generating devices. However, the device can be used to collect any type of aerosol matter or particulate matter of smoke sample. For instance, the device can be easily adapted to collect smoke samples from combustible products, such as cigarettes. The following description, however, will be more directed to collecting aerosol matter samples from aerosol-generating devices where an aerosol-generating substrate does not undergo combustion.

The aerosol matter collection device of the present disclosure is capable of automatically collecting each puff aerosol matter from an aerosol-generating device in separate sample cartridges. Each sample cartridge can include a filter material, such as a filter pad. In this manner, the contents of each puff aerosol matter can be analyzed separately for determining not only the relative amounts of components in each puff of aerosol matter but also determining how the amount of each component changes from puff to puff.

The aerosol matter collection device can include a mobile docking device for supporting an aerosol-generating device containing an aerosol-generating substrate. The docking device can be adjusted to various different aerosol-generating devices and to the size of the substrate contained in the device. For example, when the aerosol-generating substrate is in the form of rods or sticks, the docking device can be adapted to accommodate various different rod diameters in conjunction with accommodating various different heating systems contained in the aerosol-generating device. The docking device holds the aerosol-generating device and aligns the aerosol-generating device with a sample cartridge holder.

The sample cartridge holder, which can be in the shape of a motorized wheel, is configured to support a plurality of sample cartridges. Each sample cartridge contains filter material and includes an entrance and exit for allowing the recovery of aerosol collection matter on the filter pad from one puff flowing through the sample cartridge. The sample cartridge holder can have a circumference and the sample cartridges can be positioned along the circumference of the wheel. The position of the wheel can be controlled automatically by a controller. For instance, the sample cartridge holder can include various sensor cells that indicate the position of the wheel. In general, any suitable filter material can be contained in the sample cartridges. For example, in one embodiment, the sample cartridges contain filter pads having a diameter of from about 35 mm to about 50 mm.

The aerosol matter collection device further includes an aerosol withdrawing device that can also be managed or controlled by a controller. The aerosol withdrawing device can create a suction force for withdrawing a puff of aerosol from an aerosol-generating system positioned on the docking device. In one aspect, the aerosol withdrawing device can be a pneumatic jack with electrovalves for creating the suction force and for allowing control of puff volume. In order to further control puff volume, the aerosol matter collection device can further include a distance sensor, such as a laser distance sensor, placed in conjunction with the aerosol withdrawing device. The distance sensor can control displacement of a pneumatic jack piston to control puff volume with repeated accuracy. Moreover, the puff volume can be followed by the controller during puffing and can detect immediately puff volume variations versus limits defined or can detect defects in aerosol generation from the heating design.

The aerosol matter collection device can further include a pneumatic linear table system that allows for the connection between the aerosol-generating device, a sample cartridge on the sample cartridge holder, and the aerosol withdrawing device. The sample cartridges, the aerosol-generating device, and/or the aerosol withdrawing device can be fit with suitable gaskets to permit the generation and collection of a puff of aerosol matter without creating leaks. The docking device, the aerosol-generating device, and the sample cartridges can be designed to ensure minimal surface area to limit condensation before the aerosol contacting the filter material within the sample cartridges.

A controller can be used to automatically run the process of the present disclosure using the aerosol matter collection device. The controller, which can comprise one or more microprocessors such as one or more computers, can be configured to control the duration of puffing, the puff interval, and rotation of the sample cartridge holder during the process of collecting aerosol samples. For example, in one embodiment, the controller moves the docking device for causing an aerosol-generating device to engage a filter cartridge positioned on the sample cartridge holder. For example, in one embodiment, an aerosol-generating substrate contained within the aerosol-generating device can be placed within the entrance of a sample cartridge positioned on the sample cartridge holder. The controller can then control the aerosol withdrawing device for withdrawing a puff of aerosol from the aerosol-generating device. The controller can control puff volume. The puff flows through the sample cartridge for collecting an aerosol matter sample on the filter material contained within the sample cartridge. The controller then disengages the docking device from the sample cartridge held on the sample cartridge holder and moves or rotates the sample cartridge holder such that the next consecutive sample cartridge is in alignment with the docking device for repeating the process and collecting another aerosol sample by generating a second puff of aerosol from the aerosol-generating device.

The aerosol matter collection device can include appropriate counters for controlling the number of puffs generated and for controlling the number of aerosol-generating substrates heated in a puff per puff manner.

The process and system of the present disclosure provides various advantages and benefits. For instance, the sample cartridge holder can automatically generate aerosol puff samples on a filter media for further analysis. The aerosol matter sample collected can be on a puff by puff basis. In other aspects, however, one sample cartridge can be used to collect samples from multiple puffs if desired. Collecting samples on a puff by puff basis, however, allows for not only a determination of the components in each puff but also allows one to compare the different samples in order to determine if the aerosol-generating device creates variable deliveries during the course of use. In addition, the aerosol matter collection device of the present disclosure allows for various parameters to be controlled and varied. For instance, the aerosol matter collection device can be used to control puff volume, puff duration, puff interval, and the number of puffs collected from a substrate during testing. In addition, the aerosol matter collection device is designed to limit aerosol components loss, water loss or gain on filter samples during the collection of the puffs of aerosol.

Referring to FIG. 1, for instance, one embodiment of an aerosol matter collection device 10 made in accordance with the present disclosure is shown. As illustrated, the aerosol matter collection device 10 includes a sample cartridge holder 12 for holding a plurality of sample cartridges. In the embodiment illustrated, the sample cartridge holder 12 is in the shape of a wheel that rotates between stations. A different sample cartridge is contained within the sample cartridge holder 12 at each station.

Positioned in front of the sample cartridge holder 12 is a docking device 14. The docking device 14 is for receiving an aerosol-generating device. The docking device 14 is configured to move the aerosol-generating device into engagement with a sample cartridge contained on the sample cartridge holder 12.

The aerosol matter collection device 10 further includes an aerosol withdrawing device 16 that is configured to withdraw a puff of aerosol from an aerosol-generating device positioned on the docking device 14. The aerosol withdrawing device 16 generates a suction force and engages a sample cartridge contained on the sample cartridge holder 12 on a side of the sample cartridge holder 12 opposite the docking device 14.

As shown in FIG. 1, the aerosol matter collection device 10 can further include a controller 18 which, in this embodiment, is illustrated as a computer or microprocessor with a touch screen 20. In one aspect, the controller 18 can be configured to receive inputs from a user for automatically collecting aerosol matter samples. Using the touch screen 20, the user can input puff volume, the number of samples to be collected, the number of aerosol-generating substrates to be tested, and the like.

Figure 2:
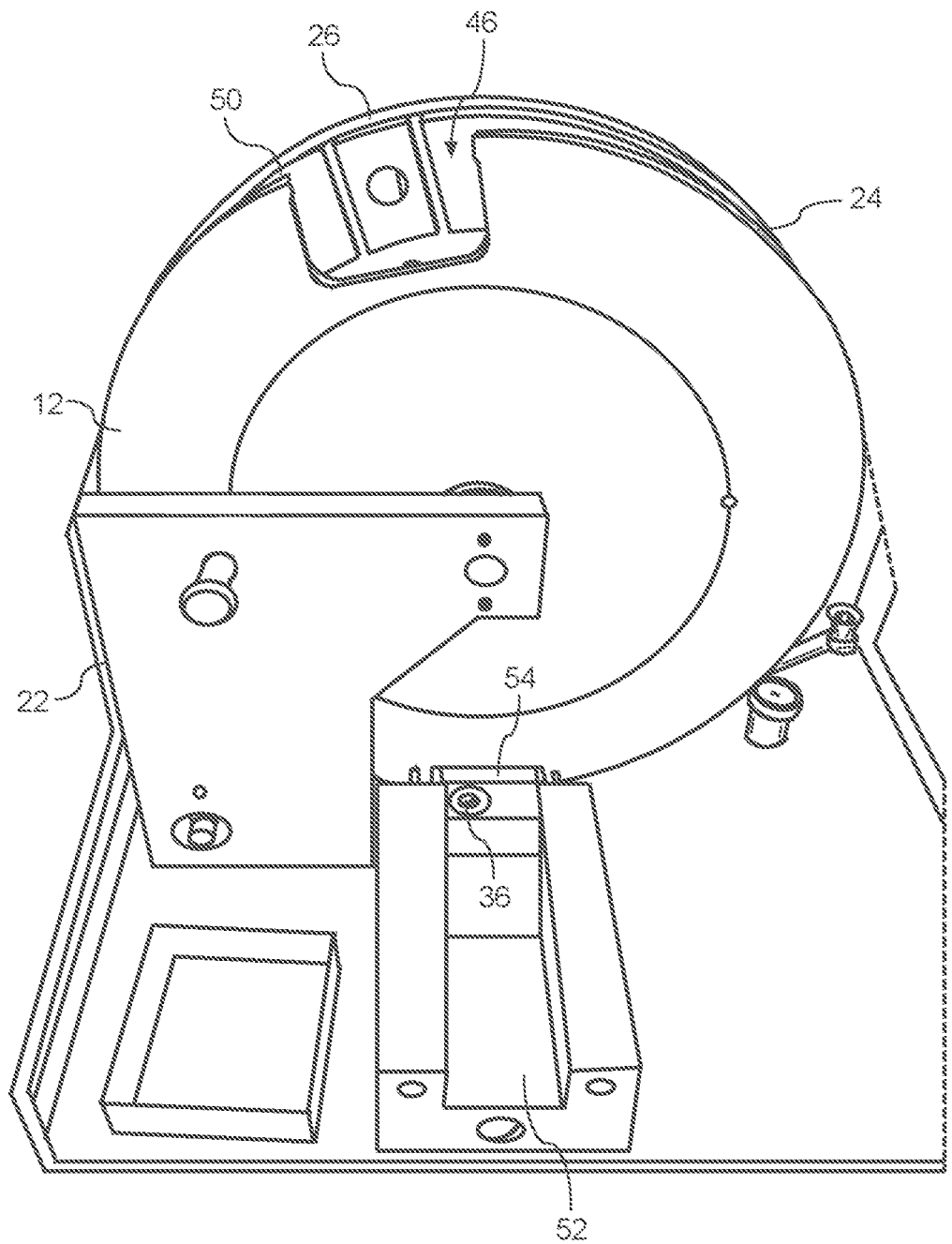
FIG. 2 is a perspective view of the aerosol matter collection device as shown in FIG. 1 particularly illustrating a docking device and sample cartridge holder.
Figure 3:
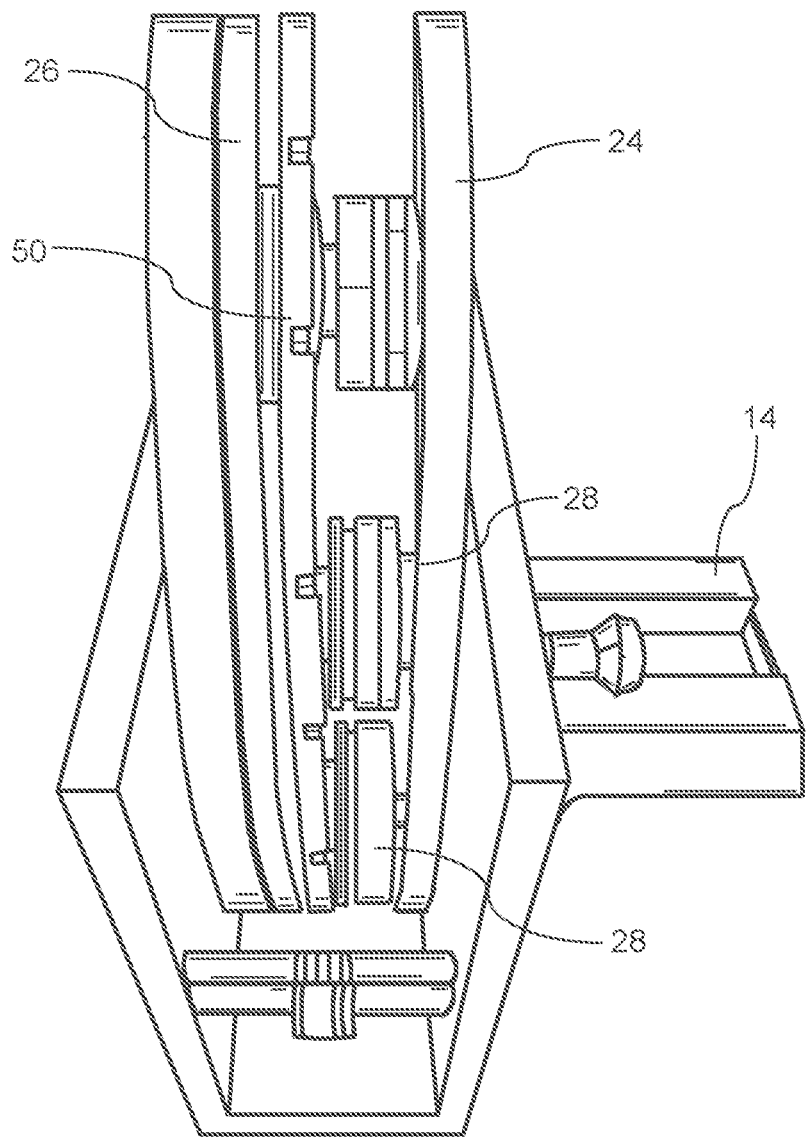
FIG. 3 is a further perspective view of the docking device and sample cartridge holder as illustrated in FIG. 2 further showing sample cartridges loaded into the sample cartridge holder.

Referring to FIGS. 2 and 3, the sample cartridge holder 12 and the docking device 14 are shown in greater detail. The sample cartridge holder 12 is in the shape of a wheel rotatably mounted onto a frame 22. The sample cartridge holder 12 is in communication with a motor that rotates the sample cartridge holder 12 during the collection of aerosol samples. The sample cartridge holder 12 includes a first outer cover 24 spaced from a second outer cover 26. Positioned inbetween the first outer cover 24 and the second outer cover 26 is a rotatable cartridge engaging section 50. As shown in FIG. 3, the cartridge engaging section 50 is configured to rotate between the two outer covers 24 and 26 and is for holding a plurality of sample cartridges 28. As shown in FIG. 3, the sample cartridges 28 can be equally spaced around the circumference of the cartridge engaging section 50. The sample cartridges 28 are for collecting aerosol samples.

Figure 4A:
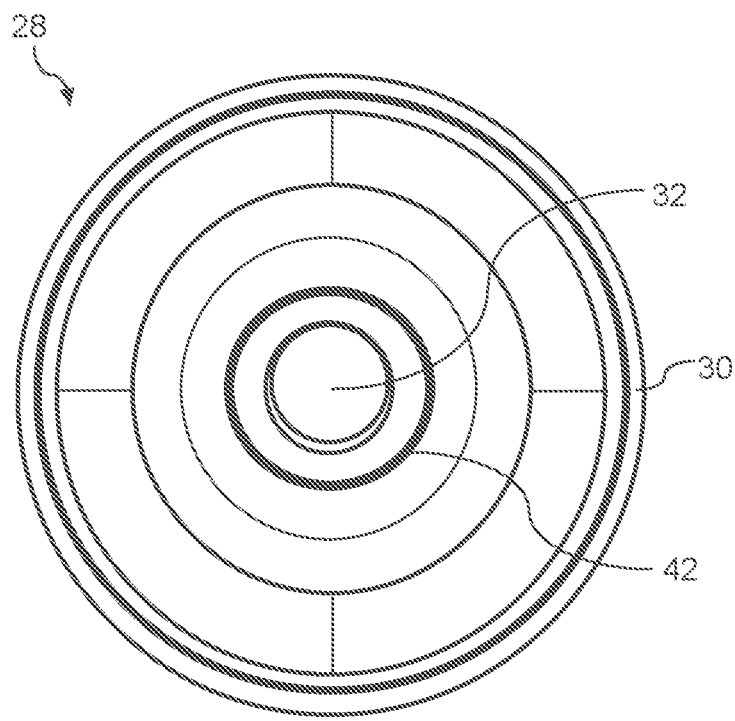
FIG. 4A is a perspective view of sample cartridges that may be used in accordance with the present disclosure.
Figure 4B:
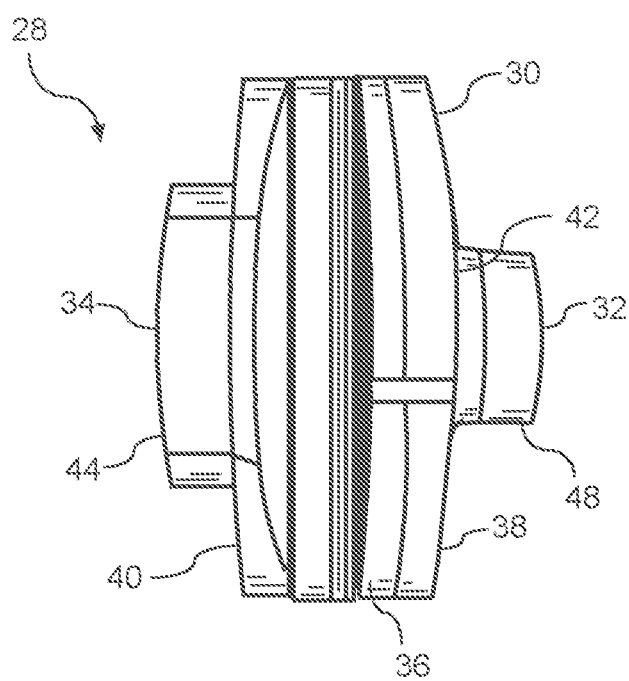
FIG. 4B is a cross-sectional view of the sample cartridge illustrated in FIG. 4A.

Referring to FIGS. 4A and 4B, one embodiment of a sample cartridge 28 is shown in greater detail. The sample cartridge 28 includes a housing 30 that defines an interior volume. The housing 30 defines an entrance 32 on one side and an exit 34 on an opposite side of the housing. Contained within the sample cartridge 28 is a filter material 36. The filter material 36 can be made from any suitable material capable of collecting an aerosol sample. For example, in one embodiment, the filter material 36 may be a circular filter pad. In one aspect, the filter pad can have a diameter of from about 30 mm to about 60 mm, such as from about 40 mm to about 48 mm. In one particular embodiment, the filter pad has a diameter of about 44 mm. The filter pads are particularly well suited for collecting a puff of aerosol generated during the process.

In order to load and unload filter material 36 from the sample cartridge 28, the housing 30 can be made from two cooperating pieces that can be separated for loading and unloading the filter material 36. For instance, as shown in FIG. 4B, the housing 30 can include a first section 38 that can be coupled to and uncoupled from a second section 40. The first section 38 can form a fluid-tight fit with the second section 40.

The sample cartridge 28 can further include gaskets made from a resilient material. As shown in FIGS. 4A and 4B, for instance, the entrance 32 can be surrounded by a first gasket 42 while the exit 34 can be surrounded by a second gasket 44. The first gasket 42 is for forming a fluid-tight fit with an aerosol-generating device for receiving a puff of aerosol. The second gasket 44, on the other hand, is for forming a fluid-tight fit with the aerosol withdrawing device 16 that is configured to create a suction force that causes a controlled volume of aerosol to flow through the sample cartridge 28 from the entrance 32 to the exit 34 for collecting a sample on the filter material 36.

The sample cartridge holder 12 can be designed to hold any suitable number of sample cartridges 28. For instance, the sample cartridge holder 12 can hold from about four sample cartridges 28 to about 40 sample cartridges 28, including all increments of one sample cartridge therebetween. For example, the sample cartridge holder 12 can contain greater than about eight sample cartridges, such as greater than about 10 sample cartridges, such as greater than about 12 sample cartridges, such as greater than about 14 sample cartridges, such as greater than about 16 sample cartridges, such as greater than about 18 sample cartridges, such as greater than about 20 sample cartridges and can contain less than about 100 sample cartridges, such as less than about 50 sample cartridges, such as less than about 30 sample cartridges, such as less than about 20 sample cartridges, such as less than about 16 sample cartridges.

In order to load and unload sample cartridges 28 into the sample cartridge holder 12, in one embodiment, the first outer cover 24 can include an opening 46 as shown in FIG. 2. The opening 46 can be used not only to cooperate with the docking device 14 but can also be used to load and unload the sample cartridges 28. The sample cartridges 28 can be held in between the first outer cover 24 and the second outer cover 26 of the sample cartridge holder 12 on the cartridge engaging section 50 using any suitable means. In one embodiment, for instance, each sample cartridge 28 can include a holder engaging portion 48 as shown in FIG. 4B. The holder engaging portion 48 can be a tab or extension that extends from the housing 30 of the sample cartridge 28. The cartridge engaging section 50 positioned in between the first outer cover 24 and the second outer cover 26, on the other hand, can include a plurality of spaced apart openings. The holder engaging portion 48 of each sample cartridge 28 can be sized to fit in one of the openings for holding the sample cartridge 28 on the sample cartridge holder 12. The openings on the cartridge engaging section 50 cooperate with the aerosol withdrawing device 16 as the cartridge engaging section 50 rotates in between the first outer cover 24 and the second outer cover 26.

The first outer cover 24 and the second outer cover 26 can provide various benefits during collection of aerosol samples. The outer covers 24 and 26, for instance, cover the sample cartridges 28 within the sample cartridge holder 12. In this manner, the outer covers 24 and 26 limit aerosol components loss and water loss or gain during sample collection on the filter material 36 contained within the sample cartridges 28. The first outer cover 24 can be configured to be manually movable for rotating the opening 46 in order to facilitate loading and unloading of the sample cartridges 28.

As shown in FIGS. 2 and 3, the first outer cover 24 is positioned adjacent to the docking device 14. The docking device 14 is for holding and moving an aerosol-generating system. The docking device 14 includes a tray 52 and an adjustable nozzle engaging device 54. The nozzle engaging device 54 includes an adjustable aperture 56. The aperture 56 is for receiving the nozzle of an aerosol-generating device. The aperture 56 can be designed to engage all different shapes and sizes depending upon the aerosol-generating device. For example, in one embodiment, an aerosol-generating substrate in the shape of a rod or stick is inserted into the aerosol-generating device. In this embodiment, the end of the aerosol-generating substrate is inserted into the aperture 56 of the nozzle engaging device 54.

In other embodiments, the aerosol-generating substrate may comprise a liquid contained within the aerosol-generating system. In this embodiment, the aerosol-generating device may include a mouthpiece that is inserted into the aperture 56 of the nozzle engaging device 54.

The docking device 14 can be movable relative to the sample cartridge holder 12. For example, in one aspect, the docking device 14 can include a linear actuated motor that can move an aerosol-generating device loaded onto the tray 52 towards and away from the sample cartridge holder 12. For instance, an aerosol-generating device can first be loaded with an aerosol-generating substrate. The aerosol-generating device can be actuated which can then, for instance, heat the aerosol-generating substrate without creating combustion. A mouthpiece of the aerosol-generating device, which can comprise the aerosol-generating substrate when in the form of a solid rod, can then be inserted into the aperture 56 of the nozzle engaging device 54. Once the aerosol-generating device is properly loaded into the docking device 14, the docking device 14 can move the aerosol-generating device into engagement with one of the sample cartridges 28 held on the sample cartridge holder 12. In particular, the docking device 14 can move the aerosol-generating device from a non-engaging position towards the docking device 14 into an engaging position where the nozzle engaging device 54 places the mouthpiece of the aerosol-generating device against the entrance 32 of a sample cartridge 28 on the sample cartridge holder 12. As described above, the sample cartridge 28 can include a gasket for forming a fluid-tight fit with the mouthpiece of the aerosol-generating device.

Once a puff of aerosol collection matter generated by the aerosol-generating system flows through the sample cartridge 28, the docking device 14 can move the aerosol-generating device from the engaging position to a non-engaging position by moving the aerosol-generating system away from the sample cartridge holder 12. The cartridge engaging section 50 of the sample cartridge holder 12 can then be rotated causing the next consecutive sample cartridge 28 held on the sample cartridge holder 12 to rotate into alignment with the docking device 14. The docking device 14 can then once again move the aerosol-generating system from the non-engaging position to the engaging position where a second puff of aerosol collection matter is fed through the next consecutive sample cartridge 28 for collecting a second aerosol sample. This process can be repeated as much as desired or until the aerosol-generating substrate has been depleted or during the period of heating of the aerosol generating device. In this manner, each sample cartridge 28 can be used to collect an aerosol collection matter sample from each single puff of aerosol.

Figure 5:
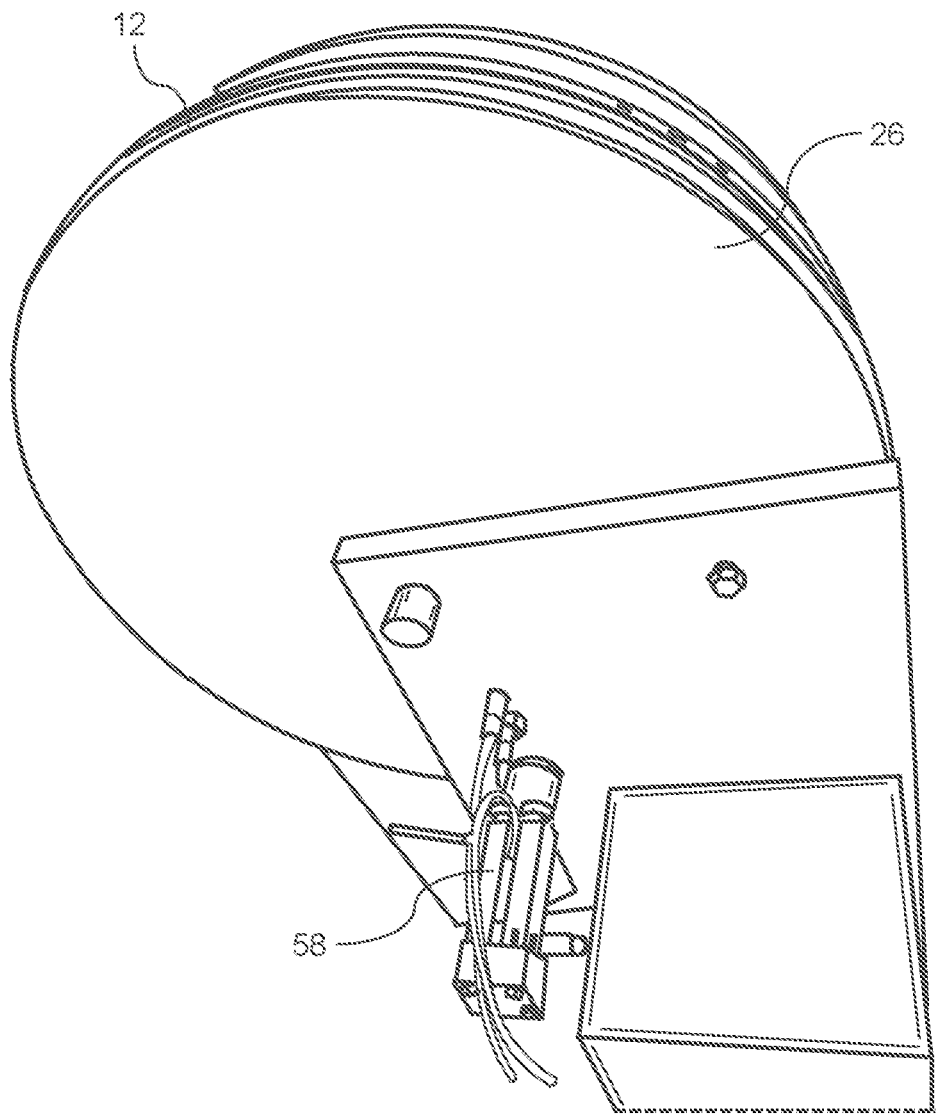
FIG. 5 is a perspective view of the opposite side of the sample cartridge holder illustrated in FIG. 2 illustrating a portion of an aerosol withdrawing device in accordance with the present disclosure.
Figure 6:
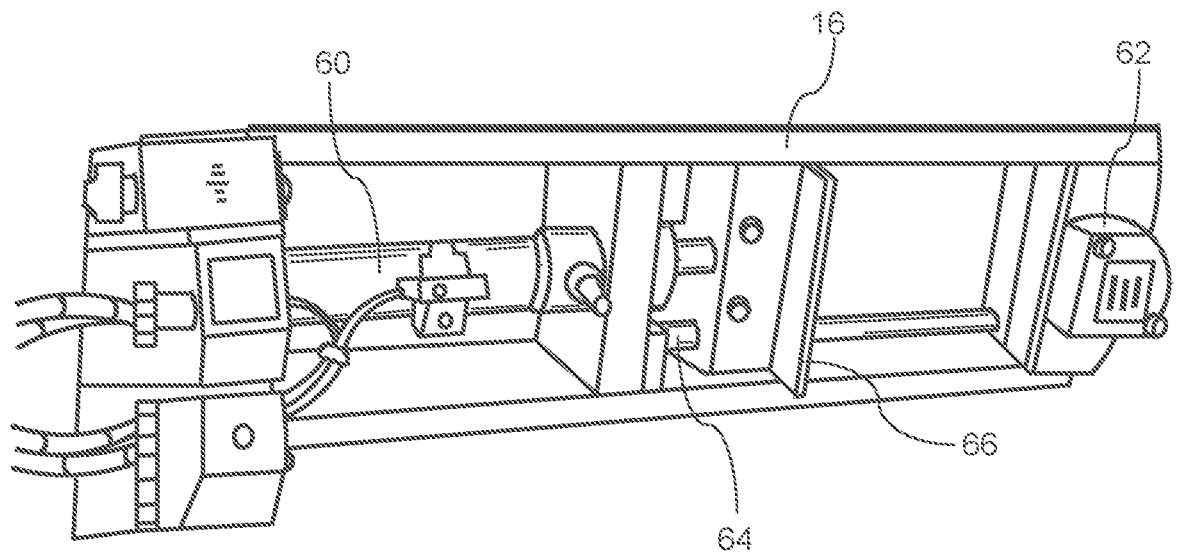
FIG. 6 is a perspective view of an aerosol withdrawing device in accordance with the present disclosure including a distance sensor for monitoring and controlling puff volume in accordance with the present disclosure.

Referring to FIGS. 5 and 6, the aerosol withdrawing device 16 is shown in greater detail. The aerosol withdrawing device 16 causes a controlled and adjustable volume of aerosol (i.e. a puff of aerosol collection matter) to be extracted from an aerosol-generating system loaded onto the docking device 14 while in engagement with one of the sample cartridges 28. The aerosol withdrawing device 16 includes a suction nozzle 58 positioned adjacent to the second outer cover 26 of the sample cartridge holder 12 on a side of the sample cartridge holder 12 opposite the docking device 14. The suction nozzle 58 is in fluid communication with a cylinder 60 that creates the suction force. The cylinder 60 is controlled by a distance sensor 62.

For example, the cylinder 60 can be a pneumatic or hydraulic cylinder that includes a plunger 64 contained within the cylindrical tube 60. Withdrawing the plunger 64 from the cylinder 60 creates a suction force that is fed to the suction nozzle 58. The suction nozzle 58 is positioned on the sample cartridge holder 12 so as to be in alignment with the exit 34 of a sample cartridge 28 that is in an engaging position with an aerosol-generating device loaded onto the docking device 14. As described above, each aerosol collection matter sample cartridge 28 can include a gasket that forms a fluid-tight fit with the suction nozzle 58. In one embodiment, the cylinder 60 is a pneumatic jack with electrovalves for creating suction and exhausting a puff of aerosol. The distance sensor 62 is for controlling the displacement of the plunger 64 for controlling puff volume. In one embodiment, for instance, the distance sensor 62 includes a laser that is aligned to contact a plate 66. The plate 66 is connected to the plunger 64 and moves back and forth as the plunger is displaced. In this manner, the laser within the distance sensor 62 can accurately measure the amount the plunger 64 withdraws from the cylinder 60 for controlling the amount of suction provided to the suction nozzle 58 and thereby controlling and registering the volume of a puff of aerosol received from an aerosol-generating system positioned in the docking device 14.

For example, the aerosol withdrawing device 16 can control the puff volume in a range of from about 35 ml to about 100 ml in increments of 0.2 ml. The puff volume can be uniform during sample collection. The puff volume can be set depending on the particular aerosol-generating substrate being consumed, based on the type of aerosol-generating device loaded onto the docking device 14, or based on a desired testing regime.

As shown in FIG. 1 and as described above, the system of the present disclosure can include a controller 18 which may include a touch screen 20. The touch screen 20 can allow a user to initiate the aerosol matter collection device and to run the process according to different user inputted parameters. For instance, the touch screen can be used to select the aerosol generating method, begin the process of puffing, allow for puff volume adjustments, and allow for time intervals between each process step.

For example, in one embodiment, the sample cartridge holder 12, the docking device 14, and the aerosol withdrawing device 16 can all be in communication with the controller 18, which may comprise one or more microprocessors. The controller can control movement of the docking device 14 and movement of the cartridge engaging section 50 of the sample cartridge holder 12 so that the docking device 14 and the sample cartridge holder 12 move in a synchronized manner. The controller 18 can also be in communication with the aerosol withdrawing device 16 for causing periodic withdrawing of a puff of aerosol collection matter from an aerosol-generating system positioned on the docking device 14 when a sample cartridge 28 is in alignment with an aerosol-generating system positioned on the docking device 14. For instance, the controller 18 can be in communication with the cylinder 60 and the distance sensor 62 for controlling and adjusting puff volume and the interval between the puffs. For example, in one embodiment, once an aerosol-generating substrate in aerosol generating device has been loaded into the system and is engaged with a sample cartridge 28 on the sample cartridge holder 12, the controller can initiate a puff by controlling the aerosol withdrawing device 16 and collect the aerosol matter through the sample cartridge 28. The time it takes for a puff of aerosol to be collected can generally be greater than about 1 second, such as greater than about 2 seconds, such as greater than about 3 seconds, and generally less than about 6 seconds, such as less than about 4 seconds. The most widely used duration is currently 2 s for heated product such as eHTP, cHTP. The puff duration is generally 3 s for e cigarette and hybrid tobacco products. After a puff of aerosol matter is collected in a sample cartridge 28, the cartridge engaging section 50 of the sample cartridge holder 12 is rotated. The controller can control the period of time between puffs of aerosol depending upon movement of the different pieces of equipment contained within the system and the puff interval defined for aerosol generating method. In general, the period of time between taking samples is from about 6 seconds to about 60 seconds. The controller can also include a built-in counter to control the number of puffs generated from a single aerosol-generating device. A counter can also be included to control the number of aerosol-generating substrates or stick tested and the number of aerosol puffs collected on each aerosol collection cartridge on a puff per puff basis. The controller can also include a counter to indicate when each of the sample cartridges contained on the sample cartridge holder 12 have received an aerosol sample and thus are ready to be removed from the sample cartridge holder 12.

Once aerosol matter samples are collected on the filter material 36 of the sample cartridges 28, the filter material can be removed from the sample cartridges and fed through any suitable analysis. For instance, the samples can be tested for the presence of different components contained in the aerosol collected matter and the amount of each component. The system of the present disclosure provides various benefits. For instance, the system can collect multiple aerosol samples from the same aerosol-generating substrate without having to use different machines. In addition, the system is completely automated.

The process and system of the present disclosure may be better understood with reference to the following examples.

Example No. 1

The following example was conducted in order to demonstrate that the system and process of the present disclosure is as accurate as a commercial smoking machine.

In this example, HEETS AMBER brand heat not burn sticks commercially available from Philip Morris purchased in France were tested. The heat t not burn device used to test the heat t not burn sticks in the system of the present disclosure was an IQOS brand device.

The heated tobacco product sticks were inserted into the system of the present disclosure and were inserted into a commercial linear smoking machine. The commercial machine used was a Borgwaldt RM4 smoking machine. Both systems were set at two second puffs duration with a puff volume of 55 mL. The puff interval was set at 30 seconds according to Health Canada intense smoking regime.

The aerosol matter from ten heated tobacco product sticks in aerosol generating devices were tested in the system of the present disclosure in a puff per puff collection manner meaning that each puff was collected successively in a different sample cartridge. Each sample cartridge will collect 1 puff of each HTP sticks with a total amount of ten puff at the end of smoking session. The aerosol matter from three heated tobacco product sticks in aerosol generating devices were collected in the commercial smoking machine. All puffs were collected together.

The following results were obtained:

| | Smoking Conditions | Aerosol Collection Matter mg/stick Mean ± IC 95% | Replicats Number |
|---|---|---|---|
| Borgwaldt RM4 smoking machine (all puff collection) | 3 sticks (12 puffs) on a filter holder | 41.2 ± 1.8 | 4 |
| System of Present Disclosure (puff per puff collection) | 10 sticks (12 puffs) on 12 filter holders | 42.5 ± 1.2 | 4 |

As shown above, the system and process of the present disclosure was very comparable to the commercial smoking machine.

Example No. 2

The following example demonstrates some of the advantages and benefits of the process and system of the present disclosure.

The system of the present disclosure was used to test the same HTP sticks used in Example No. 1 and using the same HTP device. The aerosol matter of HTP sticks in aerosol generating heating device were collected in the apparatus of the present disclosure. The apparatus was set at two second puff duration, wherein each puff had a volume of 55 mL. The puff interval was set at 10 seconds. Ten heat not burn sticks were tested in a puff by puff collection process.

Each puff was analyzed for aerosol collection mass, nicotine, and glycerin. The following results were obtained:

| | Puff | Aerosol Collection Mass (mg/puff avg.) | CI95% |
|---|---|---|---|
| ACM | 1 | 2.79 | 0.41 |
| | 2 | 3.86 | 0.34 |
| | 3 | 3.69 | 0.38 |
| | 4 | 3.50 | 0.52 |
| | 5 | 3.20 | 0.42 |
| | 6 | 2.86 | 0.31 |
| | 7 | 2.62 | 0.30 |
| | 8 | 2.31 | 0.26 |
| | 9 | 2.08 | 0.29 |
| | 10 | 1.83 | 0.34 |
| | 11 | 1.58 | 0.25 |
| | 12 | 1.42 | 0.18 |

CI Confidence Interval at 95%

| | Puff | Nicotine (mg/puff avg.) | CI 95% |
|---|---|---|---|
| Nicotine | 1 | 0.0565 | 0.0079 |
| | 2 | 0.0724 | 0.0107 |
| | 3 | 0.0710 | 0.0069 |
| | 4 | 0.0749 | 0.0059 |
| | 5 | 0.0752 | 0.0065 |
| | 6 | 0.0729 | 0.0081 |
| | 7 | 0.0737 | 0.0066 |
| | 8 | 0.0703 | 0.0058 |
| | 9 | 0.0667 | 0.0058 |
| | 10 | 0.0632 | 0.0058 |
| | 11 | 0.0607 | 0.0073 |
| | 12 | 0.0571 | 0.0058 |

| | Puff | Glycerin (mg/puff avg.) | CI 95% |
|---|---|---|---|
| Glycerin | 1 | 0.224 | 0.0495 |
| | 2 | 0.2599 | 0.0722 |
| | 3 | 0.2316 | 0.0504 |
| | 4 | 0.2408 | 0.0413 |
| | 5 | 0.2418 | 0.0374 |
| | 6 | 0.237 | 0.0326 |
| | 7 | 0.2278 | 0.0335 |
| | 8 | 0.2205 | 0.0335 |
| | 9 | 0.2105 | 0.0301 |
| | 10 | 0.1895 | 0.0265 |
| | 11 | 0.1755 | 0.025 |
| | 12 | 0.1499 | 0.0195 |

As shown above, the system and process of the present disclosure is capable of monitoring each puff generated by the heated tobacco products.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. An aerosol matter collection device comprising:
a sample cartridge holder configured to hold a plurality of sample cartridges, the sample cartridge holder being rotatable, each sample cartridge comprising a housing defining an interior volume, a filter material being positioned in the interior volume, the sample cartridge including an entrance on one side of the filter material and an exit on an opposite side of the filter material;
a docking device for receiving an aerosol-generating device, the docking device and the sample cartridge holder being moveable relative to each other such that the aerosol-generating device consecutively engages the entrance of each sample cartridge held by the sample cartridge holder; and
an aerosol withdrawing device positioned opposite the docking device for engaging the exit of each consecutive sample cartridge held within the sample cartridge holder, the aerosol withdrawing device being configured to collect a controlled volume of aerosol matter generated by the aerosol-generating device loaded onto the docking device, a controlled puff volume being forced through the sample cartridge for collecting an aerosol matter sample on the filter material contained within the sample cartridge.

2. An aerosol matter sample collection device as defined in claim 1, wherein the sample cartridge holder comprises a rotatable wheel having a circumference, the sample cartridges being positioned along the circumference of the rotatable wheel.

3. An aerosol matter collection device as defined in claim 1, wherein the sample cartridge holder is capable of holding from about 6 sample cartridges to 20 sample cartridges.

4. An aerosol matter collection device as defined in claim 1, wherein the docking device is moveable towards and away from the sample cartridge holder for engaging consecutive sample cartridges, and wherein the sample cartridge holder is moveable for positioning consecutive sample cartridges in front of the docking device.

5. An aerosol matter collection device as defined in claim 1, wherein the sample cartridge holder includes a first outer cover spaced from a second outer cover, the plurality of sample cartridges being held in between the first outer cover and the second outer cover in a spaced apart relationship.

6. An aerosol matter collection device as defined in claim 1, further comprising a controller, the controller being in communication with the docking device and the sample cartridge holder and being configured to move the docking device and the sample cartridge holder in a synchronized manner.

7. An aerosol matter collection device as defined in claim 6, wherein the controller is also in communication with the aerosol withdrawing device and is configured to control the aerosol withdrawing device for periodically collecting a puff of aerosol from an aerosol-generating device positioned on the docking device.

8. An aerosol matter collection device as defined in claim 6, wherein the controller comprises one or more microprocessors.

9. An aerosol matter collection device as defined in claim 6, wherein the controller is configured to:
(a) move the docking device into engagement with a sample cartridge contained in the sample cartridge holder;
(b) control the aerosol withdrawing device for collecting a puff of aerosol from an aerosol-generating device positioned on the docking device, the puff of aerosol flowing through the sample cartridge for collecting a sample on the filter material contained within the sample cartridge;
(c) disengaging the docking device from the sample cartridge held on the sample cartridge holder;
(d) moving the sample cartridge holder such that the next consecutive sample cartridge is in alignment with the docking device; and
(e) repeating steps (a) through (d) for collecting further aerosol samples in each of the consecutive sample cartridges.

10. An aerosol matter collection device as defined in claim 1, wherein the aerosol withdrawing device is configured to collect a puff of aerosol matter having a volume and wherein the aerosol withdrawing device is adjustable for adjusting the volume of the puff.

11. An aerosol matter collection device as defined in claim 1, wherein the aerosol withdrawing device comprises a plunger moveable within a cylindrical tube and wherein displacement of the plunger within the cylindrical tube creates a suction force.

12. An aerosol matter collection device as defined in claim 11, wherein the aerosol withdrawing device comprises a pneumatic cylinder.

13. An aerosol matter collection device as defined in claim 11, further comprising a distance sensor for sensing a distance the plunger moves in order to control puff volume collected by the aerosol withdrawing device.

14. An aerosol matter collection device as defined in claim 13, wherein the distance sensor comprises a laser that is used to measure the distance the plunger moves.

15. A process for collecting aerosol matter samples from an aerosol-generating device that generates an aerosol from a material without combusting the material, the process comprising:
(a) loading material into an aerosol-generating device for heating the material without combusting the material;
(b) moving the aerosol-generating device into contact with a sample cartridge loaded on a sample cartridge holder, the sample cartridge comprising a housing defining an interior volume, a filter material being positioned in the interior volume, the sample cartridge including an entrance on one side for receiving the aerosol-generating device and an exit on an opposite side of the sample cartridge, the filter material being positioned in between the entrance and the exit, a plurality of sample cartridges being loaded on the sample cartridge holder;
(c) withdrawing a controlled puff volume from the exit of the sample cartridge causing a puff of aerosol matter generation from the aerosol-generating device and collection on the filter pad of the sample cartridge;
(d) moving the sample cartridge holder so that the next consecutive sample cartridge is in alignment with the aerosol-generating device; and
(e) repeating steps (a) through (d) for collecting another aerosol sample.

16. A process as defined in claim 15, wherein at least three puffs of aerosol matter from the aerosol-generating devices are collected in separate sample cartridges.

17. A process as defined in claim 15, wherein the sample cartridge holder comprises a rotatable wheel having a circumference, the sample cartridges being positioned along the circumference of the rotatable wheel.

18. A process as defined in claim 15, wherein the aerosol-generating device is placed on a docking device that moves the aerosol-generating device into and out of contact with sample cartridges loaded on the sample cartridge holder.

19. A process as defined in claim 15, wherein movement of the aerosol-generating device and the sample cartridge holder are controlled automatically by a controller, the controller also being configured to control an aerosol withdrawing device for collecting a controlled puff volume from the exit of each sample cartridge.

20. A process as defined in claim 19, wherein the controller is configured to control and adjust puff volume, puff duration, and interpuff duration.

* * * * *